2,509,298

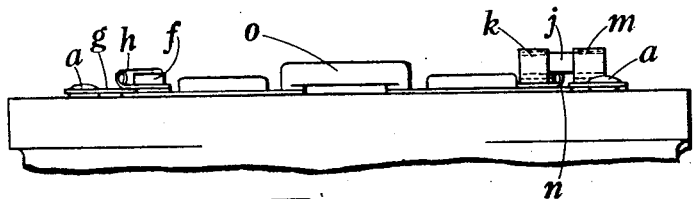
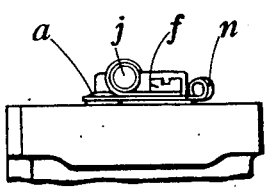
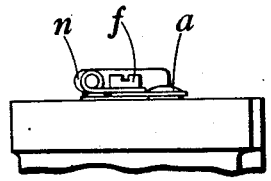
Fig. 2.
Fig. 3.  Fig. 4.
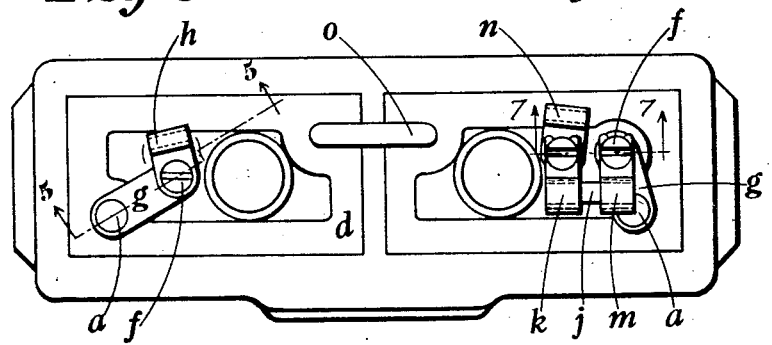
Fig. 1.
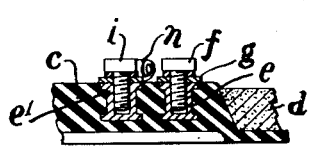
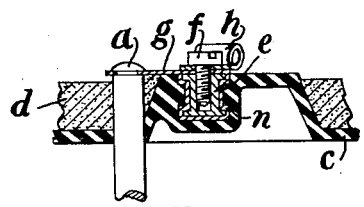
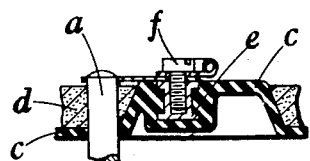
Fig. 6.  Fig. 7.
Fig. 5.
Inventors
R. Gray
H. C. Jones Patented May 30, 1950

UNITED STATES PATENT OFFICE 2,509,298

TERMINAL ARRANGEMENT FOR COMPOUND-SEALED POSTS

Robin Gray and Harold Cumberland Jones, Manchester, England, assignors to The Chloride Electrical Storage Company Limited, Clifton Junction, near Manchester, England Application November 14, 1947, Serial No. 786,108
In Great Britain November 4, 1946

Section 1, Public Law 690, August 8, 1946
Patent expires November 4, 1966

2 Claims. (Cl. 136—135)

This invention relates to electric accumulator cell or battery terminals and terminal posts.

It is known to bring the cell terminal posts out through the cell lid at portions so sunk below the surrounding surface that molten bituminous or such like sealing compound may be poured around the cell post to provide a liquid-tight seal between lid and post. Such sunken portions of the lid are usually but not always parts of the sealing trough commonly used to provide a sealed joint between cell lid and cell box. Post seals of this type are simple, and initially they are effective, but they are mechanically weak and in consequence are unduly prone to develop leaks in service when subjected to sideways or torsional forces as may from time to time be transmitted by attached cable or other conductors, or by the act of tightening such terminal nut or other clamping device as may be used to attach the external circuit conductor to the cell post. Rupture of a terminal post seal results in creepage of electrolyte which quickly causes corrosion of terminals and cables. This weakness is particularly apparent in the case of small batteries wherein the terminal post and its attachment to the battery element necessarily lack rigidity.

In the construction of a battery with compound sealed posts in accordance with this invention, the terminal device is anchored to the cell lid independently of, and separately from, its respective post by means of a metallic insert embedded or secured in the substance of the lid at a point removed laterally from said post, means being provided to establish the necessary electrical connection between post and terminal.

The improved arrangement may be provided in connection with the end or terminal posts only of a multi-cell battery, or it may be provided on individual cell posts as, for instance where it is desired to disconnect or reconnect individual cells easily or frequently.

Referring to the accompanying explanatory drawings:

Figure 1 is a plan view, Figure 2 a front elevation, Figure 3 an end elevation looking from right to left in Figure 2, Figure 4 an end elevation looking from left to right in Figure 2, and Figure 5 a sectional elevation on the line 5—5 of Figure 1, showing the top portion of an electric accumulator or storage battery having terminal arrangements constructed and arranged in one convenient form in accordance with this invention.

Figure 6 is a sectional elevation on the line 6—6 in Figure 1, and Figure 7 is a section similar to Figure 5, of a modified construction.

The cell posts $a$ (for the external connections of the cell) which are connected in the usual way with the plates in the accumulator extend through the cover $c$ of the latter and through the sealing compound $d$ in the recessed parts of the cover. Moulded in the cell cover adjacent to each post is a nutlike part $e$ which has a tapped hole therein to receive a screw $f$ which clamps on to the nut $e$ a link $g$ which may be in the form of a lead-alloy strap welded or lead burned to the post $a$, and, in the arrangement shown on the left hand side of Figure 1, a link $h$ to which the external lead is secured by being soldered in the eye of the link. In the case of the terminal arrangement shown on the right in Figure 1, a second nutlike part $e^1$ is moulded into the cover $c$ adjacent to that connected by a strap to the cell post as already described. On each nutlike part, fuse carriers $k$ and $m$ are clamped by screws $i$ and $f$ and onto the second is also clamped the link $n$ to which the external lead is secured. The fuse $j$ can then be mounted to protect the battery being held in the curved ends of the clips $k$ and $m$.

$o$ indicates the inter-cell connector.

It will be appreciated that where a fuse is not required on the accumulator, the two terminal arrangements may be the same.

The metallic insert $e$ embedded in the lid may have an outer covering $p$ (Figure 7) of lead or lead allow and may be, for instance, an insert comprising a brass nut embedded in a small lead casting. The link $g$ between cell post $a$ and lid terminal insert $e$ may in this case with advantage be welded or lead-burned at both ends, one end to the cell post $a$ and the other end to the lead covering of the insert $e$ in the lid, which covering may be extended upwards above the surface of the lid for convenience in welding. The terminal clamping screw $f$ is then required only to clamp the cable or other conductor of the external circuit.

The terminal insert $e$ instead of being tapped to receive a screw may have a projecting threaded stem to receive a clamping nut or may be made entirely of lead or lead alloy to allow for welded connections both to the post link and to the external circuit.

As the terminal insert $e$ can be completely sealed off from the interior of the cell preferably by the material of the lid, it is permissible to use therefor metals such as brass or the like, which would be quite unsuitable for the usual accumulator lid inserts in which resistance to electrolyte corrosion is a primary consideration.

What we claim is:

1. A terminal arrangement for an electrical accumulator, comprising a moulded insulating cell cover, cell posts extending through the cell cover, plastic sealing compound for sealing the cell posts in the cell cover, a metal insert moulded in the cell cover adjacent to each cell post, an external strap connected to each cell post, an attachment for an accumulator lead, and means for connecting the strap and the attachment to the metal insert.

2. A terminal arrangement for an electrical accumulator, having a moulded cell cover, two cell posts which extend through such cover and plastic sealing compound which seals each cell post within the cell cover, a metal insert moulded in the cell cover adjacent to each cell post, an external strap connecting each cell post and its adjacent metal insert, a second metal insert moulded in the cell cover in convenient relation to one of said inserts, fuse holders mounted on said second insert and the adjacent insert so that a fuse may connect the inserts, and means associated with the said second insert and also with the single insert adjacent a cell post for securing a lead.

ROBIN GRAY.
HAROLD CUMBERLAND JONES.

REFERENCES CITED

The following references are of record in the file of this patent:

UNITED STATES PATENTS

| Number | Name | Date |
|---|---|---|
| 418,701 | Dey | Jan. 7, 1890 |
| 695,707 | Bugg | Mar. 18, 1902 |
| 1,175,651 | Marko | Mar. 14, 1916 |

FOREIGN PATENTS

| Number | Country | Date |
|---|---|---|
| 104,931 | Australia | Sept. 8, 1938 |
| 117,388 | Australia | Aug. 10, 1943 |
| 452,447 | Germany | Oct. 27, 1927 |